United States Patent
Glaser, II

(10) Patent No.: US 12,206,343 B1
(45) Date of Patent: Jan. 21, 2025

(54) KINETIC-POWERED BATTERY SYSTEMS FOR MUSICAL INSTRUMENTS AND RELATED METHODS

(71) Applicant: Glaser Instruments, LLC, Nashville, TN (US)

(72) Inventor: Joseph Glaser, II, Nashville, TN (US)

(73) Assignee: Joseph Glaser, II, Nashville, TN (US)

( * ) Notice: Subject to any disclaimer, the term of this patent is extended or adjusted under 35 U.S.C. 154(b) by 578 days.

(21) Appl. No.: 17/677,768

(22) Filed: Feb. 22, 2022

Related U.S. Application Data

(60) Provisional application No. 63/151,626, filed on Feb. 19, 2021.

(51) Int. Cl.
| | | |
|---|---|---|
| H02N 2/18 | (2006.01) | |
| G10D 1/00 | (2020.01) | |
| G10D 1/08 | (2006.01) | |
| H01M 10/46 | (2006.01) | |
| H02J 7/14 | (2006.01) | |
| H02K 35/00 | (2006.01) | |

(52) U.S. Cl.
CPC .............. *H02N 2/18* (2013.01); *G10D 1/085* (2013.01); *H01M 10/46* (2013.01); *H02J 7/14* (2013.01); *H02K 35/00* (2013.01)

(58) Field of Classification Search
CPC ......... H02N 2/18; H02K 35/00; H01M 10/46; H02J 7/14; G10D 1/085
USPC .................................................. 320/107, 108
See application file for complete search history.

(56) References Cited

U.S. PATENT DOCUMENTS

| | | | | |
|---|---|---|---|---|
| 4,644,211 | A * | 2/1987 | Idogaki | H01F 7/145 |
| | | | | 310/40 MM |
| 5,822,167 | A * | 10/1998 | Schmitz | H01F 7/1844 |
| | | | | 361/143 |
| 2004/0217874 | A1* | 11/2004 | Tsou | G08B 5/38 |
| | | | | 340/686.1 |
| 2007/0145746 | A1* | 6/2007 | Biamonte | A43B 13/182 |
| | | | | 290/1 R |
| 2017/0346377 | A1* | 11/2017 | Deak, Sr. | H02K 35/02 |
| 2020/0076288 | A1* | 3/2020 | Nerubenko | F16F 7/1005 |
| 2021/0036583 | A1* | 2/2021 | Forthuber | H02P 25/064 |
| 2021/0135557 | A1* | 5/2021 | Taylor | H02K 5/173 |
| 2021/0313861 | A1* | 10/2021 | Taylor | H02K 35/04 |

FOREIGN PATENT DOCUMENTS

| | | | | |
|---|---|---|---|---|
| JP | S6260996 U | * | 4/1987 | ............. G10H 1/053 |
| WO | WO-2005008804 A2 | * | 1/2005 | ............ B60L 11/1877 |

* cited by examiner

*Primary Examiner* — Phallaka Kik
(74) *Attorney, Agent, or Firm* — Jonathan Spangler, Esq.; Jay Bell, Esq.

(57) ABSTRACT

Kinetic-powered battery systems for musical instrument that can build a charge based on some or all of the physical motion exerted upon the musical instrument. This physical motion can arise from any conceivable activity, including (but not limited to) handling, travel activity, playing the musical instrument and/or intentionally shaking the musical instrument to build a charge prior to use. The kinetic rechargeable power system for musical instruments has application in any conceivable musical instrument, including (but not limited to) acoustic and electric instruments, wireless transmitters or microphones or any related sound reinforcement equipment currently using batteries and subject to movement in travel, setup, use, or intentional movement to create sufficient charge.

22 Claims, 5 Drawing Sheets

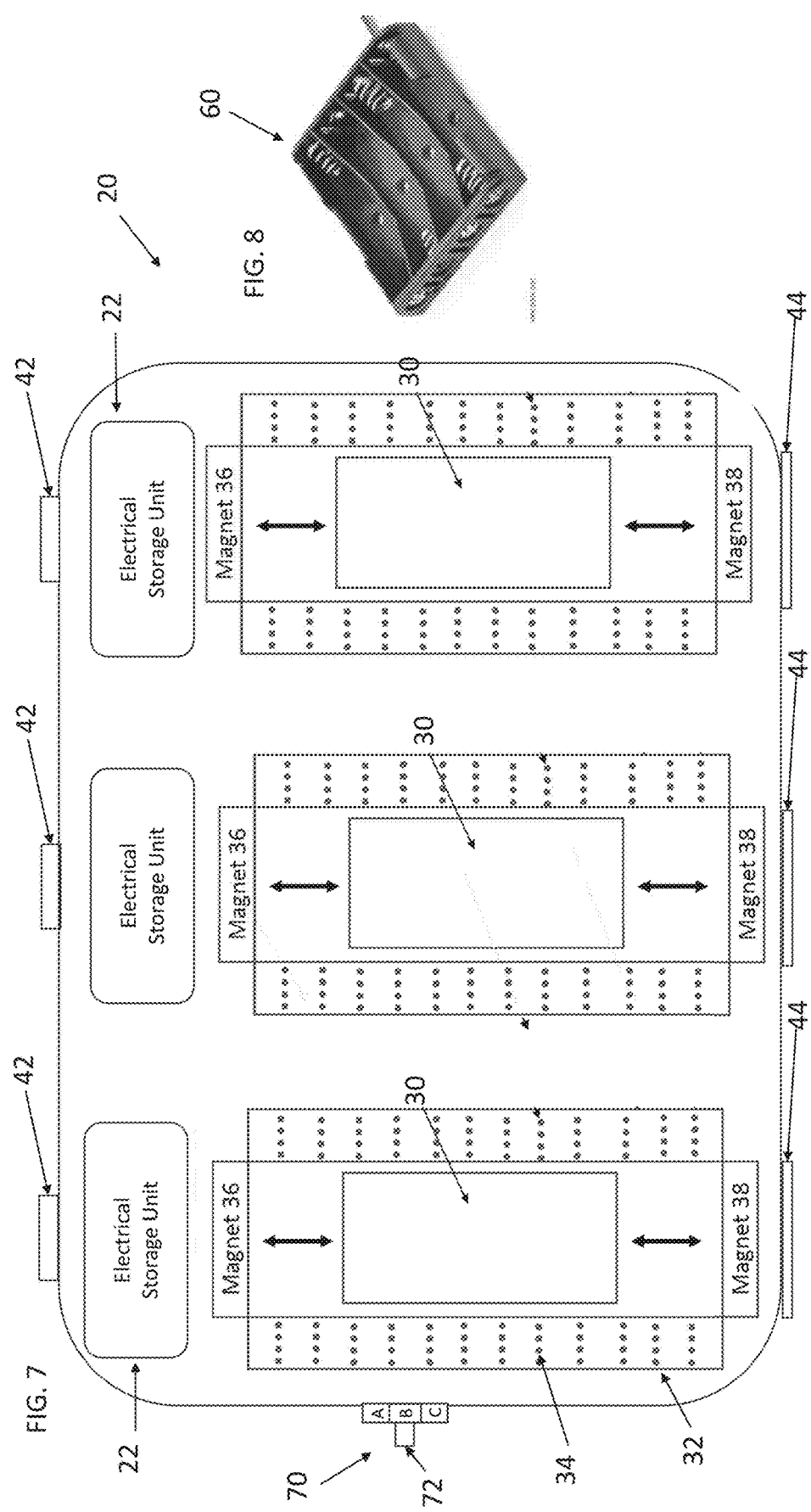

KINETIC-POWERED BATTERY SYSTEMS FOR MUSICAL INSTRUMENTS AND RELATED METHODS

CROSS-REFERENCE TO RELATED APPLICATIONS

This application claims the benefit under 35 U.S.C. § 119(e) of U.S. Patent Application No. 63/151,626 entitled "KINETIC-POWERED BATTERY SYSTEMS FOR MUSICAL INSTRUMENTS AND RELATED METHODS," filed Feb. 19, 2021, which is incorporated herein by reference in its entirety.

BACKGROUND OF THE INVENTION

I. Field of the Invention

This disclosure relates to the general field of motion-powered electronics, and more specifically toward kinetic regenerative batteries for use in musical instruments.

II. Discussion of the Prior Art

Many guitars and other musical instruments employ onboard electronics, including preamps, electronic tuners as well as digital sound processors that provide delay, distortion, etc. These are commonly powered by batteries that have a finite charge and can fail before or during use. They are also often difficult to check, access, or replace, and having spare batteries is an unpredictable problem. The present invention is directed at overcoming, or at least reducing, the problems of prior art techniques for powering onboard electronics for musical instruments.

SUMMARY OF THE INVENTION

The present invention overcomes the disadvantages of the prior art in a variety of manners, including but not limited to the following. In one aspect, a kinetic-powered battery system is provided that can build a charge based on some or all of the physical motion exerted upon the musical instrument. This physical motion can arise from any conceivable activity, including (but not limited to) handling, travel activity, playing the musical instrument and/or intentionally shaking the musical instrument to build a charge prior to use.

The kinetic rechargeable power system for musical instruments of the present invention has application in any conceivable musical instrument, including (but not limited to) acoustic and electric instruments, wireless transmitters or microphones or any related sound reinforcement equipment currently using batteries and subject to movement in travel, setup, use, or intentional movement to create sufficient charge.

In so doing, the present invention is advantageous over the prior art for a host of reasons. It overcomes the prior art by exploiting and capturing the movement of a musical instrument and utilizing energy previously unavailable to the native or aftermarket electronics. By capitalizing on the kinetic energy from the movement of the instrument, the systems of the present invention can recharge batteries or otherwise power the onboard electronics. In so doing, the present invention avoids or minimizes the need to use or change-out standard batteries that are typically used to power onboard electronics. This, in turn, minimizes or eliminates the oftentimes tedious take of battery replacement, which can be extremely inopportune especially if the batteries fail while playing or performing on the musical instrument.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 7 is an example of a Battery Replacement version of the kinetic-powered battery system according to an aspect of the present invention, suitable for replacing multiple AAA batteries by way of example only; and FIG. 8 is an example of a housing for multiple AAA batteries, which may be used with the Battery Replacement version set forth in FIG. 7 according to an aspect of the present invention.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. The kinetic-powered battery systems and methods for musical instruments disclosed herein boasts a variety of inventive features and components that warrant patent protection, both individually and in combination.

Figure 2:
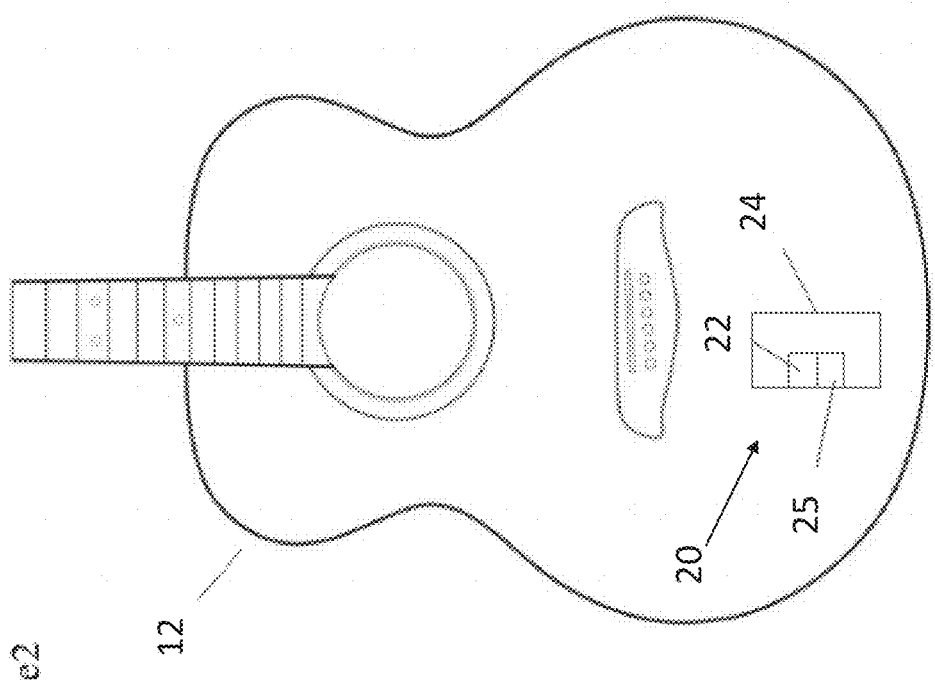
FIG. 2 is a "Battery Replacement" version of a kinetic-powered battery system according to an aspect of the present invention, mounted to an electric guitar by way of example only.
Figure 1:
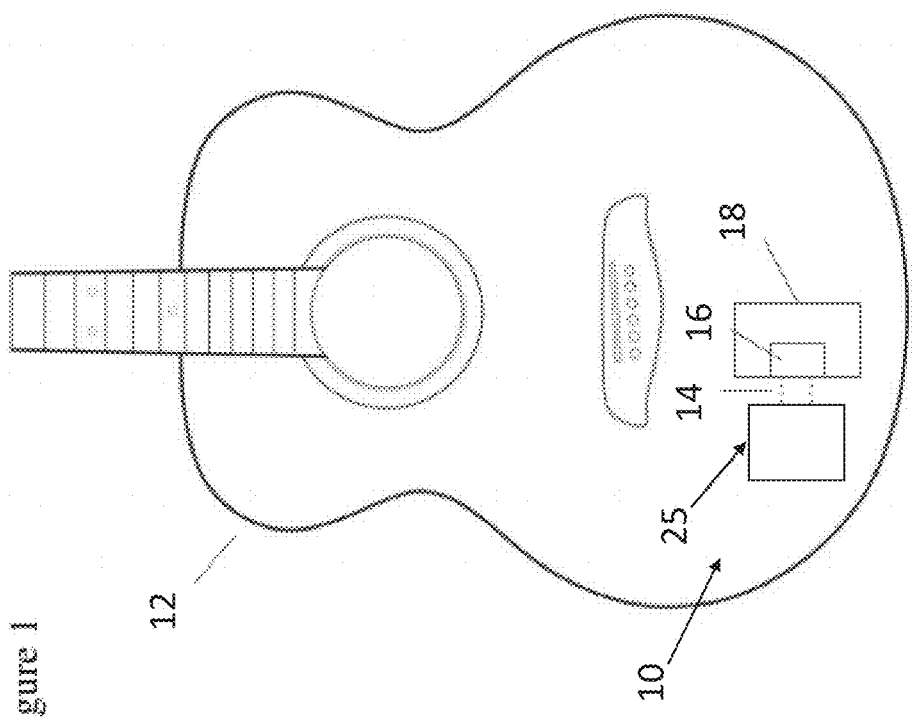
FIG. 1 is an "OEM" version of a kinetic-powered battery system according to an aspect of the present invention, mounted to an electric guitar by way of example only.

The kinetic-powered battery systems of the present invention can come in a variety of forms, including but not limited to those shown in FIG. 1 and FIG. 2. FIG. 1 shows an "OEM" version kinetic-powered battery system 10. FIG. 2 shows a "Battery-Replacement" version kinetic-powered battery system 20. While shown mounted to a guitar 12 (by way of example only), it will be appreciated that either kinetic-powered battery systems 10, 20 may be used with any of a variety of musical instruments, including but not limited to stringed instruments (e.g. acoustic guitars, electric guitars, bass guitars, ukuleles, violins, etc. . . . ), wireless transmitters or microphones or any related sound reinforcement equipment currently using batteries for or with musical instruments and subject to movement in travel, setup, use, or intentional movement to create sufficient charge.

Figure 3:
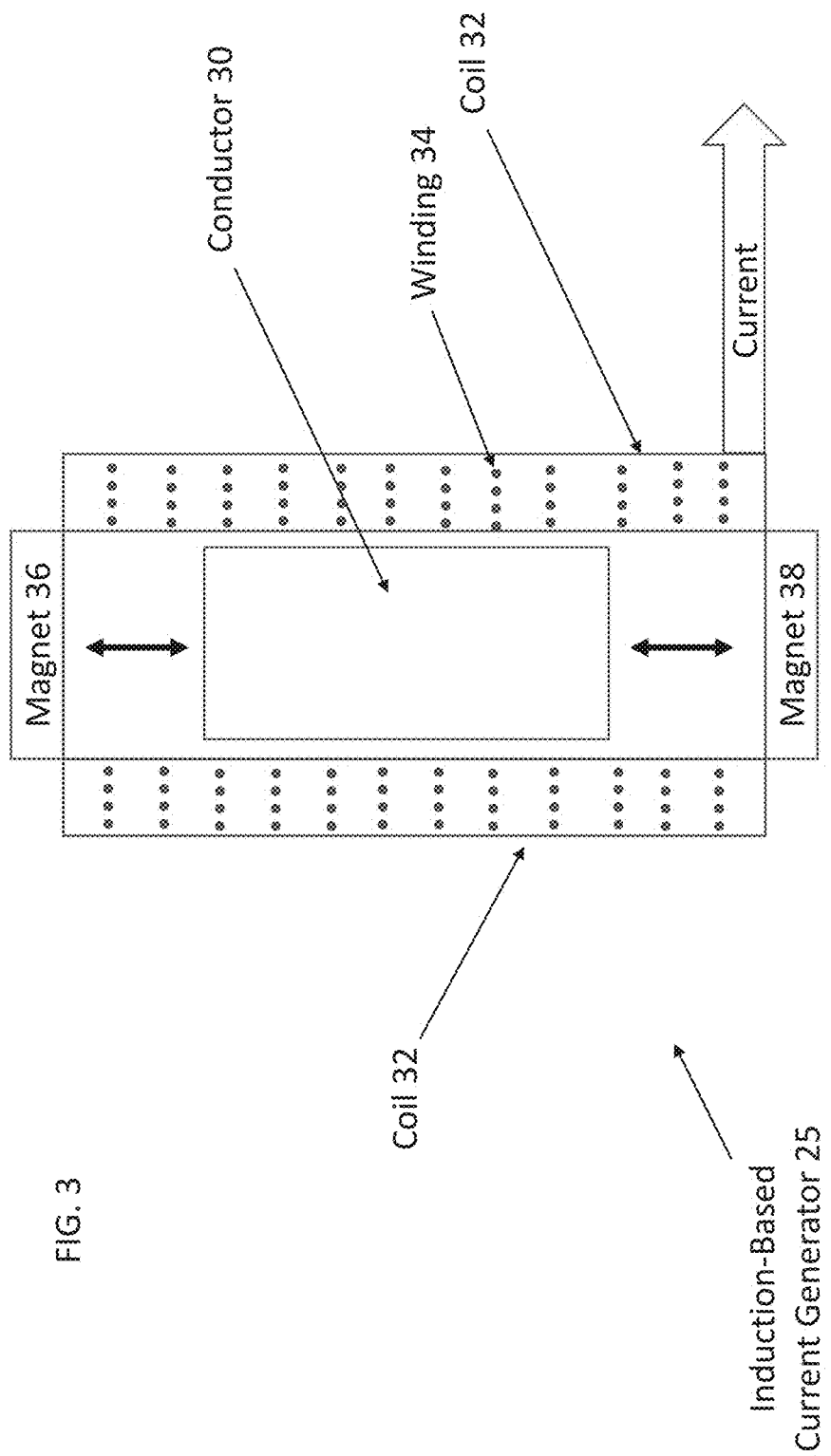
FIG. 3 is an induction-based current generator for use in musical instruments according to an aspect of the present invention.

The kinetic-powered battery systems 10, 20 of the present invention operate based on Faraday's Law of Induction. By way of example only, this may be accomplished using an induction-based current generator 25 as illustrated generally in FIG. 3. The induction-based current generator 25 employs at least one electrical conductor 30 configured to move through a magnetic field generated by a coil 32 to induce an electrical current (1) proportional to the speed of the movement of the conductor 30 relative to the coil 32. In one embodiment, the conductor 30 may be repelled by magnets 36, 38 disposed on either end of the coil 32 such that, in the absence of motion, the conductor 30 will lay at rest in between the magnets 36, 38. Upon motion, the conductor 30 will be forced away from the repellant forces of each of the magnets 36, 38, thereby causing the conductor 30 to "bounce" between the magnets 36, 38 to generate electrical current as it passes back and forth through the coil 32.

The motion between the conductor(s) and the magnetic field (coils) is relative, so the resulting current can be generated by: a) moving the conductor(s) while the associated magnetic coil(s) are maintained in a stationary or otherwise static position; and/or b) moving the magnetic coil(s) while the associated electrical conductor(s) is/are maintained in a stationary or otherwise static position. The motion may be active or passive without departing from the scope of the present invention. Active motion may be accomplished by adding a crank or other mechanical means to actively move the conductor 30 and/or coil 32 to create the relative motion sufficient to generate the desired electrical current. Passive motion may be accomplished by simply moving the overall musical instrument (e.g. via travel, shaking the instrument, playing the instrument, etc. . . . ) to create the relative motion sufficient to generate the desired electrical current.

For the "OEM" version of FIG. 1, the kinetic-powered battery system 10 can convert movement into functional energy and transfer said energy through electric diodes 14 to a rechargeable battery or other storage device 16 and in-turn provide sufficient power to run a native or OEM electric device 18 installed on or within the musical instrument 12. The electric diodes 14 may comprises any of a variety of suitable diode devices, whether commercially available and/or future-developed systems. The rechargeable battery or other storage device 16 may comprise any number of suitable batteries or electrical storage devices, including (but not limited to) commercially available rechargeable batteries, capacitors, etc. . . . and/or future-developed systems. OEM electric device 18 may comprise any of a variety of original equipment manufacture devices, including (but not limited to) commercially available on-board pre-amps, tuners, etc. . . . and/or later-developed systems.

For the "Replacement Battery" version of FIG. 2, the kinetic-powered battery system 20 may include, by way of example only, the induction-based current generator 25 and an electrical storage unit 22 which in combination can function as a direct battery replacement. In one embodiment, the kinetic-powered battery system 20 is preferably configured to reside within a manufacturer-installed battery housing 24. The physical size and arrangement of the induction-based current generator 25 and electrical storage unit 22 are shown by way of example only, and it will be appreciated that one of ordinary skill in the art may provide either or both in any of a variety of suitable sizes and configurations without departing from the scope of the present invention. For example, if the battery housing 24 is designed to receive a standard 9-volt battery, then the induction-based current generator 25 and the electrical storage unit 22 may be figured to reside within some or all of that 9-Volt battery footprint.

For both the "OEM" version and "Replacement Battery" version, the kinetic-powered battery systems 10, 20 will include the necessary electrical connections to establish (directly or indirectly) the required electrical connectivity to the rechargeable battery or storage device 16 and electrical storage unit 22, respectively. For example, in the "Battery Replacement" version shown in FIG. 4, the electrical storage unit 22 may be coupled to a standard dual connector 40 commonly used for 9-volt batteries. In this manner, the kinetic-powered battery system 20 may be quickly and easily swapped out for a standard 9-volt battery using the dual connector 40.

Figure 4:
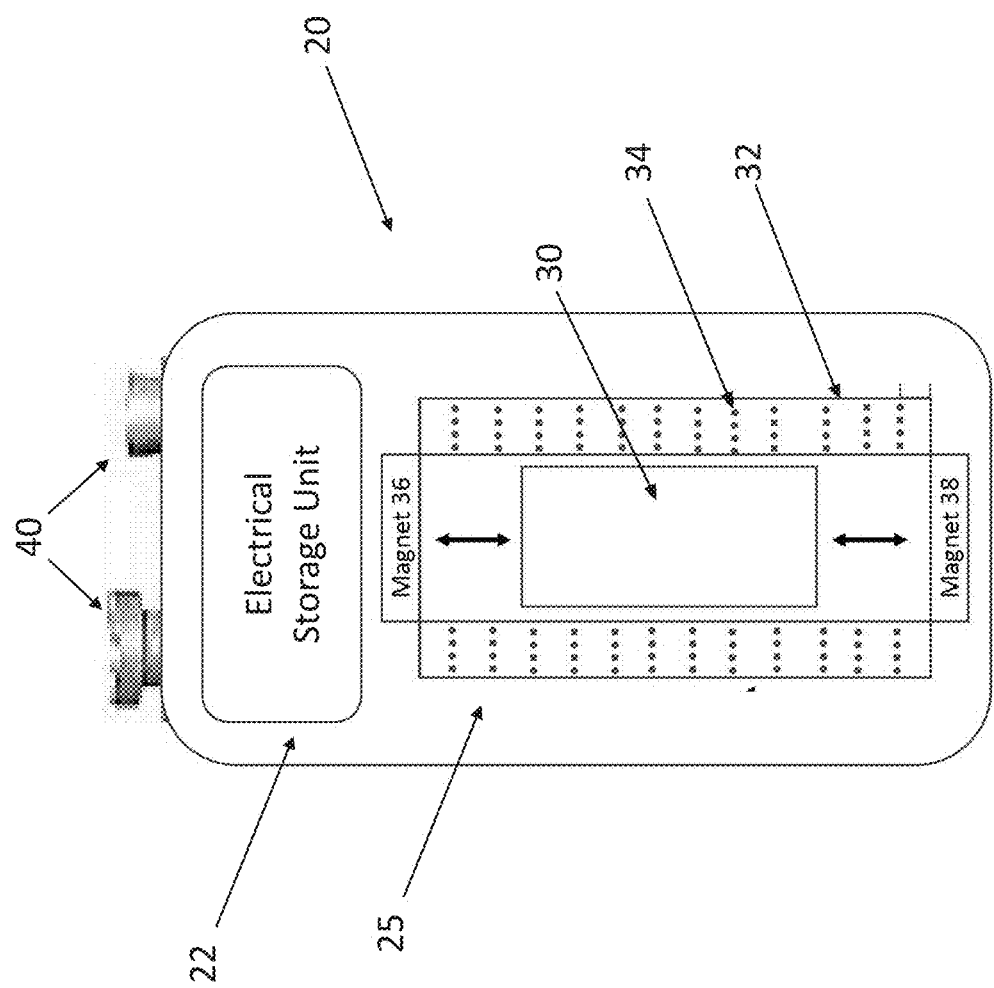
FIG. 4 is an example of a Battery Replacement version of the kinetic-powered battery system according to an aspect of the present invention, suitable for replacing a 9 volt battery by way of example only.
Figure 6:
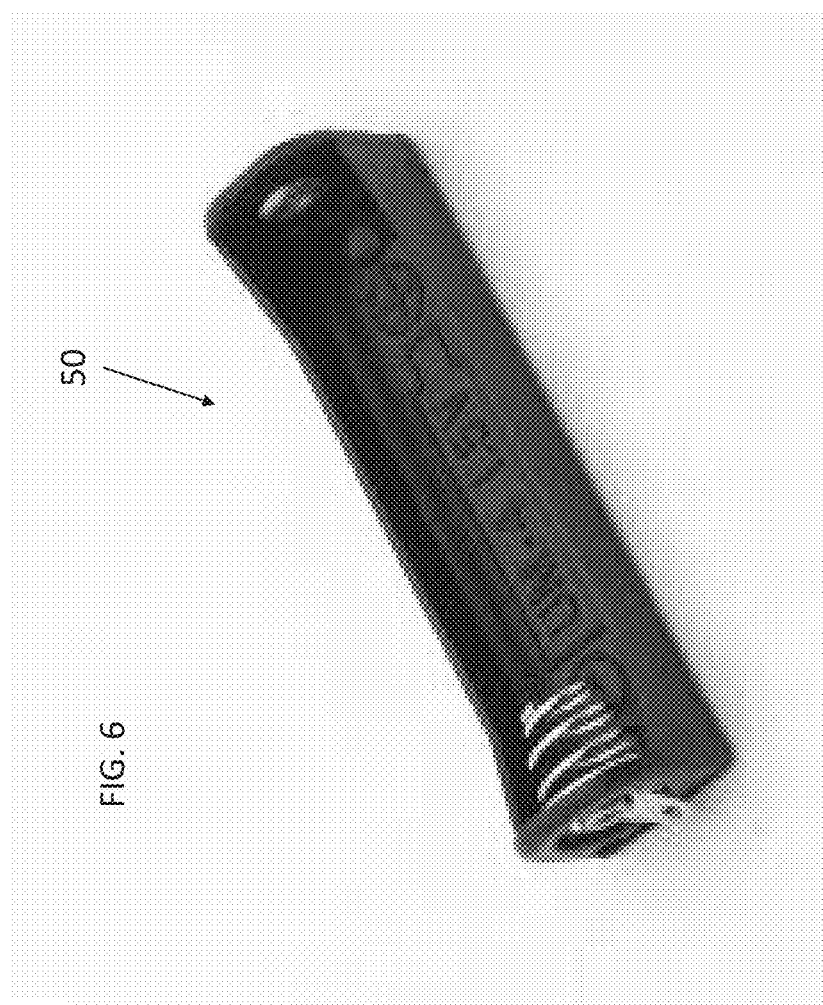
FIG. 6 is an example of a housing for a single AAA battery, which may be used with the Battery Replacement version set forth in FIG. 5 according to an aspect of the present invention.
Figure 5:
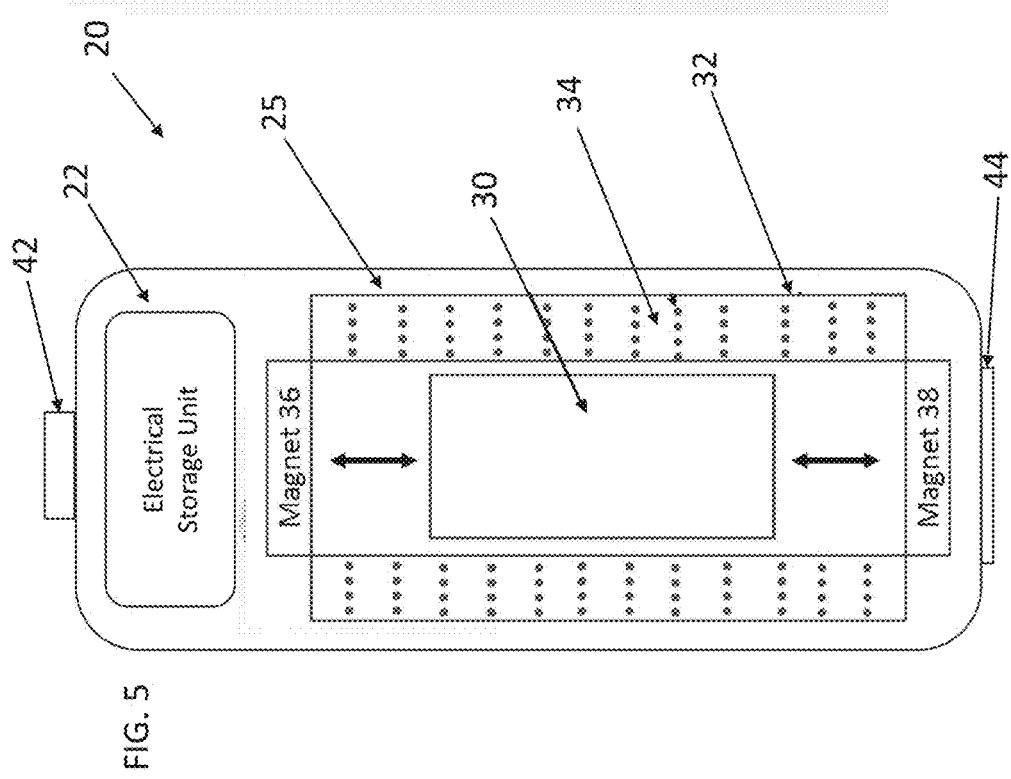
FIG. 5 is an example of a Battery Replacement version of the kinetic-powered battery system according to an aspect of the present invention, suitable for replacing a single AAA battery by way of example only.

While shown within the context of a 9-volt battery replacement in FIG. 4, it will be understood that the kinetic-powered battery system 20 may take the form of any of a variety of currently known or later-developed batteries. For example, AAA batteries as shown in FIGS. 5 and 6, which can be housed within the single AAA battery housing 50 and electrically coupled via the positive terminal 42 and negative terminal 44 into the associated connections within the housing 50.

As shown in FIGS. 7 and 8, the kinetic-powered battery system 20 may also be configured to fit in a multi-battery housing, such the 3-AAA battery housing 60 of FIG. 8. In this case, an optional switch 70 may be provided, with a toggle 62 that is capable of being moved into one of three positions for optionality in selecting the voltage level of the kinetic-powered batter system 20. For example, the toggle 72 in position A for Voltage 1 (e.g. 1.5 volts), position B for Voltage 2 (e.g. 3 volts) and position C for Voltage 3 (e.g. 9 volts). The voltages may vary depending upon the application and the number of positions for the toggle 72.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Any of the features or attributes of the above the above-described embodiments and variations can be used in combination with any of the other features and attributes of the above-described embodiments and variations as desired. From the foregoing disclosure and detailed description of certain preferred embodiments, it is also apparent that various modifications, additions and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A kinetic-powered battery system for a musical instrument, comprising:
    an electrical storage unit configured to receive and store an electrical charge suitable to power an electrically-powered device mounted to a musical instrument; and
    an induction-based current generator in electrical communication with the electrical storage unit for generating an electrical charge to be stored in said electrical storage unit to power said electrically-powered device mounted to said musical instrument, said induction-based current generator including an electrical conductor, a coil configured to generate a magnetic field and including a recess dimensioned to slidably receive said electrical conductor, and a pair of magnets arranged on either side of said recess of said coil to maintain said conductor in a static position at a location in between said pair of magnets when said induction-based current generator is at rest and to allow said conductor to slidably translate within said recess of said coil when said induction-based current generator is in motion, wherein relative motion created between the electrical conductor and the coil when the induction-based current generator is in motion will cause the electrical conductor to slidably translate within said recess of said coil and thereby generate an electrical current sufficient to charge said electrical storage to power said electrically-powered device mounted to said musical instrument.

2. The kinetic-powered battery system for a musical instrument of claim 1, wherein said musical instrument is a stringed musical instrument.

3. The kinetic-powered battery system for a musical instrument of claim 2, wherein said stringed musical instrument is at least one of an acoustic guitar, an electric guitar, a bass guitar, a ukulele, a mandolin, a banjo, and a violin.

4. The kinetic-powered battery system for a musical instrument of claim 1, wherein said electrically-powered device mounted to a musical instrument is at least one of a wireless transmitter, a tuner, a microphone, an active pick-up, a pre-amplifier, and an on-board effects device.

5. The kinetic-powered battery system for a musical instrument of claim 1, wherein said electrical storage unit and said induction-based current generator are mounted to said musical instrument as an after-market consumer product.

6. The kinetic-powered battery system for a musical instrument of claim 1, wherein said electrical storage unit and said induction-based current generator are mounted to said musical instrument during manufacture of said musical instrument.

7. The kinetic-powered battery system for a musical instrument of claim 1, including a manual crank connected to said induction-based current generator, said manual crank configured to be operated to actively create relative motion between said electrical conductor and said coil.

8. The kinetic-powered battery system for a musical instrument of claim 1, wherein said electrical storage unit is at least one of a rechargeable battery and a capacitor.

9. The kinetic-powered battery system for a musical instrument of claim 1, wherein said electrical storage unit and said induction-based current generator are housed within a structure dimensioned to fit in a battery housing mounted to said musical instrument.

10. The kinetic-powered battery system for a musical instrument of claim 9, wherein said structure includes electrical connections to electrically couple said electrical storage unit to electrical connections of said battery housing mounted to said musical instrument.

11. The kinetic-powered battery system for a musical instrument of claim 10, wherein said battery housing includes a switch capable of being moved into one of multiple positions for selecting one of multiple electrical charge levels to power said electrically-powered device mounted to said musical instrument.

12. A method of kinetically powering an electrically-powered device mounted to a musical instrument, comprising the steps of:
    mounting an electrical storage unit to said musical instrument, wherein said electrical storage unit is configured to receive and store an electrical charge suitable to power an electrically-powered device mounted to a musical instrument; and
    mounting an induction-based current generator to said musical instrument, wherein said induction-based current generator is in electrical communication with the electrical storage unit and configured to generate an electrical charge to be stored in said electrical storage unit sufficient to power said electrically-powered device mounted to said musical instrument, said induction-based current generator including an electrical conductor, a coil configured to generate a magnetic field and including a recess dimensioned to slidably receive said electrical conductor, and a pair of magnets arranged on either side of said recess of said coil to maintain said conductor in a static position at a location in between said pair of magnets when said induction-based current generator is at rest and to allow said conductor to slidably translate within said recess of said coil when said induction-based current generator is in motion, wherein relative motion created between the electrical conductor and the coil when the induction-based current generator is in motion will cause the electrical conductor to slidably translate within said recess of said coil and thereby generate an electrical current sufficient to charge said electrical storage to power said electrically-powered device mounted to said musical instrument.

13. The method of claim 12, wherein said musical instrument is a stringed musical instrument.

14. The method of claim 13, wherein said stringed musical instrument is at least one of an acoustic guitar, an electric guitar, a bass guitar, a ukulele, a mandolin, a banjo, and a violin.

15. The method of claim 12, wherein said electrically-powered device is at least one of a wireless transmitter, a tuner, a microphone, an active pick-up, a pre-amplifier, and an on-board effects device.

16. The method of claim 12, wherein said electrical storage unit and said induction-based current generator are mounted to said musical instrument as an after-market consumer product.

17. The method of claim 12, wherein said electrical storage unit and said induction-based current generator are mounted to said musical instrument during manufacture of said musical instrument.

18. The method of claim 12, wherein said induction-based current generator includes a manual crank configured to be operated to actively create relative motion between said electrical conductor and said coil.

19. The method of claim 12, wherein said electrical storage unit is at least one of a rechargeable battery and a capacitor.

20. The method of claim 12, wherein said electrical storage unit and said induction-based current generator are housed within a structure dimensioned to fit in a battery housing mounted to said musical instrument.

21. The method of claim 20, wherein said structure includes electrical connections to electrically couple said electrical storage unit to electrical connections of said battery housing mounted to said musical instrument.

22. The method of claim 21, wherein said battery housing includes a switch capable of being moved into one of multiple positions for selecting one of multiple electrical charge levels to power said electrically-powered device mounted to said musical instrument.

\* \* \* \* \*